United States Patent
Komatsu et al.

(10) Patent No.: US 12,085,150 B2
(45) Date of Patent: Sep. 10, 2024

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Kenji Komatsu, Kobe (JP); Hideyuki Imai, Kobe (JP); Hidenori Arisawa, Kobe (JP); Yuji Shinoda, Kobe (JP); Mitsuaki Tanaka, Kobe (JP); Yoshiyuki Noguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 114 days.

(21) Appl. No.: 17/788,363

(22) PCT Filed: Dec. 18, 2020

(86) PCT No.: PCT/JP2020/047401
§ 371 (c)(1),
(2) Date: Jun. 23, 2022

(87) PCT Pub. No.: WO2021/132070
PCT Pub. Date: Jul. 1, 2021

(65) Prior Publication Data
US 2023/0027400 A1   Jan. 26, 2023

(30) Foreign Application Priority Data
Dec. 25, 2019 (JP) .................................. 2019-234734

(51) Int. Cl.
*F16H 15/38* (2006.01)
*F16H 57/04* (2010.01)

(52) U.S. Cl.
CPC .......... *F16H 15/38* (2013.01); *F16H 57/043* (2013.01); *F16H 57/0471* (2013.01); *F16H 57/049* (2013.01)

(58) Field of Classification Search
CPC .... F16H 15/38; F16H 57/043; F16H 57/0471; F16H 57/049; F16C 33/6677
See application file for complete search history.

(56) References Cited

U.S. PATENT DOCUMENTS 6,616,568 B2 * 9/2003 Ooyama ................. F16H 15/38
476/40

FOREIGN PATENT DOCUMENTS

| | | | |
|---|---|---|---|
| JP | 10-292821 | * | 11/1998 |
| JP | 2011-112153 | * | 6/2011 |

(Continued)

OTHER PUBLICATIONS

International Search Report of PCT/JP2020/047401 dated Feb. 9, 2021 [PCT/ISA/210].

*Primary Examiner* — William C Joyce
(74) *Attorney, Agent, or Firm* — Sughrue Mion, PLLC

(57) ABSTRACT

A toroidal continuously variable transmission including a power roller; a support supporting the power roller rotatably; a thrust bearing receiving a load of the power roller in a direction along a rotating axis; and an oil passage supplying lubricating oil to the thrust bearing. A surface of the power roller opposing the support includes a first bearing grooved and the support opposing the power roller includes a second bearing groove. A virtual axis of a discharge port in the oil passage reaches a bearing groove that is one of the first bearing groove and the second bearing groove. Viewed from a direction perpendicular to the rotation axis, a portion of a retainer located at a radially inner side of a retaining hole of the retainer and a portion located at a radially inner side of the bearing groove are located at sides opposite to each other across the virtual axis.

11 Claims, 9 Drawing Sheets

(56) References Cited

FOREIGN PATENT DOCUMENTS

JP          2012-225479 A    11/2012
WO   WO 2010 142736    * 12/2010

* cited by examiner

TOROIDAL CONTINUOUSLY VARIABLE TRANSMISSION

CROSS REFERENCE TO RELATED APPLICATIONS

This application is a National Stage of International Application No. PCT/JP2020/047401, filed Dec. 18, 2020, claiming priority to Japanese Patent Application No. 2019-234734, filed Dec. 25, 2019.

TECHNICAL FIELD

The present disclosure relates to a toroidal continuously variable transmission.

BACKGROUND ART

A toroidal continuously variable transmission that continuously changes a change gear ratio by tilting a power roller interposed between an input disc and an output disc has been known. For example, in the toroidal continuously variable transmission disclosed in PTL 1, the power roller is supported by a support (outer ring) so as to be rotatable by a thrust bearing. The thrust bearing includes rolling elements that roll in an annular groove as a bearing groove (raceway surface) formed on opposing surfaces of the power roller and the support. The rolling elements are lined up around a rotation axis of the power roller along the annular groove. The thrust bearing further includes a retainer that retains the rolling elements in retaining holes lined up in an annular shape and maintains constant intervals of the rolling elements. Moreover, lubricating oil is supplied to the thrust bearing.

CITATION LIST

Patent Literature

PTL 1: Japanese Laid-Open Patent Application Publication No. 2012-225479

SUMMARY OF INVENTION

Technical Problem

According to the thrust bearing, a large amount of heat is generated at a contact portion between the rolling element and the bearing groove (raceway surface) that is a surface on which the rolling element rolls. To cool such heat generating portion, it is desirable to supply lubricating oil at a high flow velocity to the heat generating portion from the viewpoint of a heat transfer rate. However, according to the conventional configuration, the lubricating oil to be supplied to the thrust bearing collides with the power roller, the support, the retainer of the thrust bearing, and the like, and this decreases the flow velocity of the lubricating oil, and after that, the lubricating oil reaches the rolling elements. Therefore, to adequately cool the heat generating portion, a large amount of lubricating oil needs to be supplied to the thrust bearing.

Solution to Problem

A toroidal continuously variable transmission according to one aspect of the present disclosure includes: an input disc and an output disc arranged so as to be opposed to each other; a power roller that is sandwiched between the input disc and the output disc so as to be tiltable and transmits rotational driving force of the input disc to the output disc at a change gear ratio corresponding to a tilt angle of the power roller; a trunnion that is tiltable about a tilt axis of the power roller; a support that is arranged between the trunnion and the power roller in a direction along a rotation axis of the power roller and supports the power roller such that the power roller is rotatable relative to the trunnion about the rotation axis; a thrust bearing that receives a load of the rotating power roller in the direction along the rotation axis; and an oil passage through which lubricating oil is supplied to the thrust bearing. An opposing surface of the support which surface is opposed to the power roller includes a first bearing groove having an annular shape about the rotation axis. An opposing surface of the power roller which surface is opposed to the support includes a second bearing groove that is opposed to the first bearing groove and has an annular shape about the rotation axis. The thrust bearing includes: rolling elements held by the first bearing groove and the second bearing groove so as to be rollable; and an annular retainer arranged between the power roller and the support and including retaining holes that hold the rolling elements. The oil passage includes nozzles that are located at a radially inner side of the retainer and define a flow direction of the lubricating oil flowing toward the thrust bearing. Each of virtual axes of discharge ports of the nozzles extends in the flow direction of the nozzle and reaches a bearing groove that is one of the first bearing groove and the second bearing groove. The power roller or the support including the bearing groove includes an inner groove shoulder portion that is a portion located at a radially inner side of the bearing groove. When viewed from a direction perpendicular to the direction along the rotation axis, the inner groove shoulder portion and an inner peripheral portion of the retainer which is a portion located at a radially inner side of the retaining holes are located at respective sides opposite to each other across the virtual axis and away from the virtual axis.

According to the above configuration, the virtual axis of the discharge port of the nozzle extends in the flow direction of the nozzle and reaches the first bearing groove or the second bearing groove without contacting the inner peripheral portion of the retainer and the inner groove shoulder portion of the support or the power roller. Therefore, the lubricating oil discharged from the nozzle reaches the first bearing groove or the second bearing groove while avoiding a decrease in the flow velocity due to collision with obstacles, such as the inner peripheral portion of the retainer. With this, the lubricating oil can be supplied at a high flow velocity to a portion of the thrust bearing where a large amount of heat is generated, and therefore, a large amount of heat can be removed from the heat generating portion by a relatively small amount of lubricating oil. On this account, cooling efficiency of the thrust bearing by the lubricating oil can be improved.

Advantageous Effects of Invention

One aspect of the present disclosure can provide a toroidal continuously variable transmission that can improve cooling efficiency of a thrust bearing by lubricating oil.

DESCRIPTION OF EMBODIMENTS

Hereinafter, embodiments will be described with reference to the drawings. In the present description, the term "perpendicular" may denote "substantially perpendicular." The same is true for "parallel," "orthogonal," and "skew lines."

Embodiment 1

Figure 1:
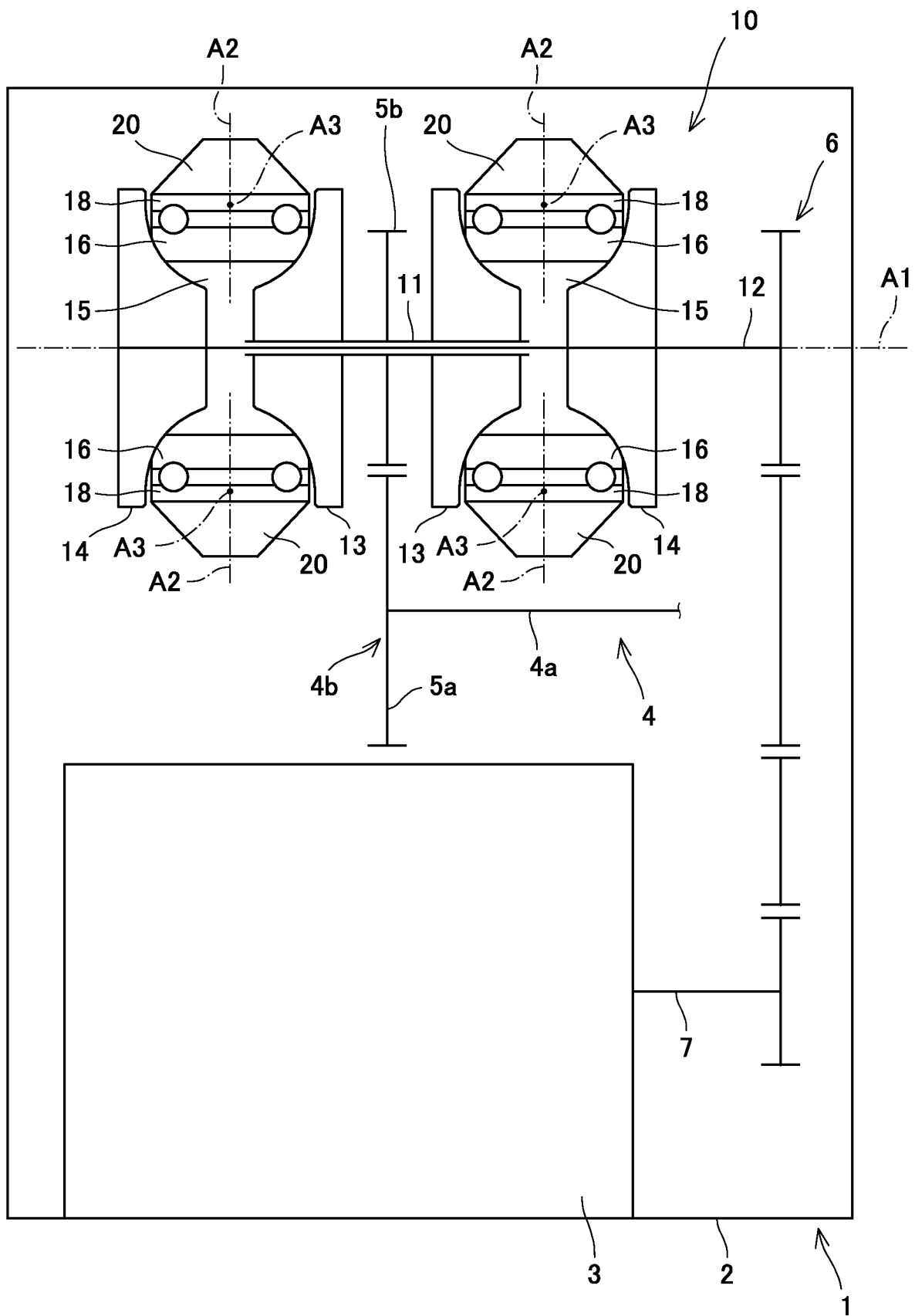
FIG. 1 is a schematic diagram schematically showing a power transmission path of a drive mechanism-integrated electric power generating apparatus according to Embodiment 1.

As shown in FIG. 1, a drive mechanism-integrated electric power generating apparatus (Integrated Drive Generator; hereinafter referred to as an "IDG") 1 includes a casing 2 that accommodates a power generator 3 and a toroidal continuously variable transmission (hereinafter referred to as a "transmission") 10. The IDG 1 is used as an AC power supply of an aircraft, and the casing 2 is attached to an engine of the aircraft.

The transmission 10 includes a transmission input shaft 11 and a transmission output shaft 12 which are coaxially arranged and are rotatable relative to each other (hereinafter, a rotation axis of the two shafts 11 and 12 is referred to as a "transmission center axis A1").

The transmission input shaft 11 is connected to an engine rotating shaft through an input mechanism 4. The input mechanism 4 includes a device input shaft 4a and a gear pair 4b. Rotational power taken out from the engine rotating shaft is input to the device input shaft 4a, and the gear pair 4b transmits the rotation of the device input shaft 4a to the transmission input shaft 11. The gear pair 4b includes a transmitting gear 5a and a transmission input gear 5b. The transmitting gear 5a rotates integrally with the device input shaft 4a. The transmission input gear 5b meshes with the transmitting gear 5a and rotates integrally with the transmission input shaft 11. The device input shaft 4a is parallel to an axial direction of the transmission 10, and the gear pair 4b is a parallel axis gear pair. The transmission output shaft 12 is connected to a power generator input shaft 7 through a power transmission mechanism 6 (for example, a parallel axis gear train).

Part of the device input shaft 4a, the gear pair 4b, the power transmission mechanism 6, and the power generator input shaft 7 are also accommodated in the casing 2. One or more accessories (for example, an oil pump) of the IDG 1 may be driven based on the rotational power taken out from the input mechanism 4 or the power transmission mechanism 6.

The rotational power taken out from the engine rotating shaft is input to the transmission input shaft 11 through the input mechanism 4. The transmission 10 changes the speed of the rotation of the transmission input shaft 11 and outputs the rotation to the transmission output shaft 12. The rotation of the transmission output shaft 12 is output to the power generator input shaft 7 through the power transmission mechanism 6. When the power generator input shaft 7 rotates, the power generator 3 generates AC power at a frequency proportional to a rotational speed of the power generator input shaft 7. The change gear ratio of the transmission 10 is continuously changed regardless of the fluctuation of the rotational speed of the engine rotating shaft such that the rotational speed of the power generator input shaft 7 is maintained at an appropriate value (value corresponding to a frequency (400 Hz, for example) suitable for the operations of electric components in the aircraft). With this, the frequency is maintained at a certain appropriate value.

The transmission 10 is of a half toroidal type and a double cavity type and includes two pairs of discs that are input discs 13 and output discs 14. The input discs 13 are disposed on an outer peripheral surface of the transmission input shaft 11 so as to rotate integrally with the transmission input shaft 11. The output discs 14 are disposed on an outer peripheral surface of the transmission output shaft 12 so as to rotate integrally with the transmission output shaft 12. A pair of discs 13 and 14 are arranged so as to be opposed to each other in the axial direction of the transmission 10 and forms one annular cavity 15 that is located at a radially outer side of the two shafts 11 and 12 and is continuous in a circumferential direction of the transmission center axis A1. The two pairs of discs that are the input discs 13 and the output discs 14 are lined up in the axial direction of the transmission 10, and therefore, two cavities 15 are lined up in the axial direction of the transmission 10.

The transmission 10 is of a middle input type. The transmission output shaft 12 is inserted into the hollow transmission input shaft 11 and projects from the transmission input shaft 11 toward both sides. The two output discs 14 are respectively arranged at the two projecting portions of the transmission output shaft 12. The two input discs 13 are arranged back to back on the transmission input shaft 11. The transmission input gear 5b is disposed on the outer peripheral surface of the transmission input shaft 11 and is arranged between the two input discs 13. A component (for example, a spur gear) constituting an upstream end of the power transmission mechanism 6 is disposed on the outer peripheral surface of one of the projecting portions of the transmission output shaft 12 and is arranged at an opposite side of the input disc 13 across the output disc 14 on this projecting portion in the axial direction of the transmission 10.

The transmission 10 includes power rollers 16, supports 18, and trunnions 20. One support 18 and one trunnion 20 are disposed so as to correspond to one power roller 16. The power rollers 16 are the same in structure as each other. The supports 18 are the same in structure as each other. The trunnions 20 are the same in structure as each other.

The power rollers 16 (for example, two power rollers 16) are arranged in one cavity 15 at equal intervals in the circumferential direction of the transmission center axis A1. The power roller 16 is supported so as to be rotatable about a rotation axis A2 relative to the corresponding trunnion 20 through the corresponding support 18. The support 18 is arranged between the trunnion 20 and the power roller 16 in a direction along the rotation axis A2 of the power roller 16 and supports the power roller 16 such that the power roller 16 is rotatable relative to the trunnion 20 about the rotation axis A2. The trunnion 20 is supported so as to be tiltable relative to the casing 2 about a tilt axis A3 and be movable in a direction along the tilt axis A3. The tilt axis A3 and the transmission center axis A1 are skew lines, and the rotation axis A2 is perpendicular to the tilt axis A3.

The casing 2 stores multipurpose oil. For example, the oil is supplied as traction oil to a contact portion between the power roller 16 and the input disc 13 (this contact portion is hereinafter referred to as an "input contact portion") and a contact portion between the power roller 16 and the output disc 14 (this contact portion is hereinafter referred to as an "output contact portion"). The power roller 16 is pressed against the discs 13 and 14 at high pressure by high clamping force generated in the axial direction of the transmission 10 by a clamp mechanism (not shown). With this, oil films having high viscosity are formed on the input contact portion and the output contact portion. When the clamp mechanism is of a hydraulic type, the oil is supplied as operating oil to the clamp mechanism.

When the transmission input shaft 11 rotates, each input disc 13 is rotated, and each power roller 16 is rotated about the rotation axes A2 by shear resistance of the oil film generated at the input contact portion. When the power roller 16 rotates, the output disc 14 is rotated by the shear resistance of the oil film generated at the output contact portion, and this rotates the transmission output shaft 12. When the trunnion 20 and the power roller 16 attached thereto move in the direction along the tilt axis A3, a rotation angle (hereinafter referred to as a "tilt angle") of the power roller 16 around the tilt axis A3 is changed, and the change gear ratio of the transmission 10 is continuously changed in accordance with the tilt angle. As above, in the transmission 10, the rotational power is transmitted from the transmission input shaft 11 to the transmission output shaft 12 by traction drive. The power roller 16 is sandwiched between the input disc 13 and the output disc 14 so as to be tiltable about the tilt axis A3. The power roller 16 changes the speed of the rotational driving force of the input disc 13 at a change gear ratio corresponding to the tilt angle and transmits the rotational driving force to the output disc 14.

Figure 2:
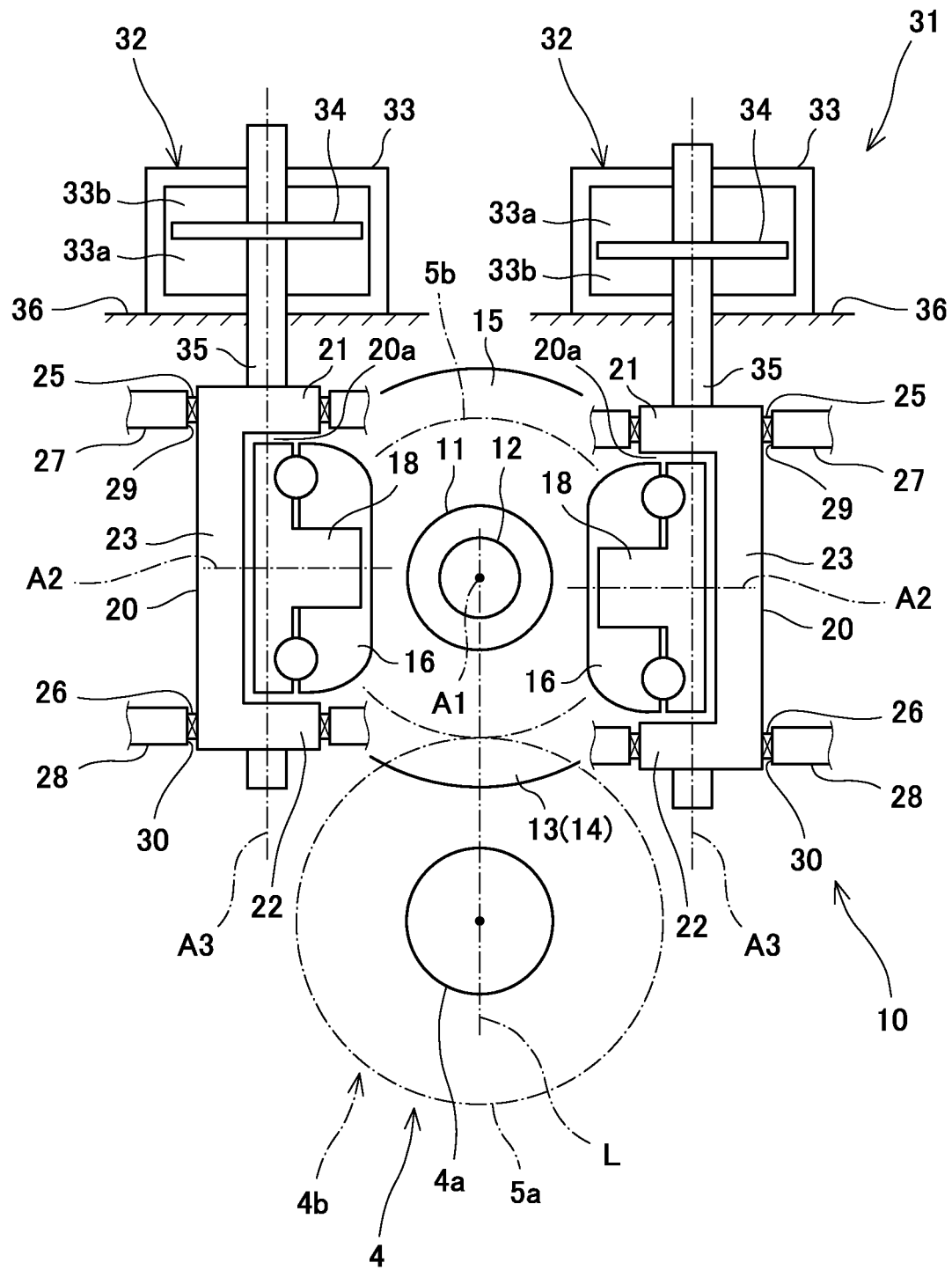
FIG. 2 is a diagram showing the configuration of the toroidal continuously variable transmission in Embodiment 1.

As shown in FIG. 2, the trunnion 20 includes: a pair of pivots 21 and 22 arranged coaxially; and a main body 23 to which the power roller 16 is attached through the support 18. Each of the pivots 21 and 22 has a substantially disc shape or a substantially cylindrical shape, and center lines of the pivots 21 and 22 are located on the tilt axis A3 or constitute the tilt axis A3. The main body 23 extends in the direction along the tilt axis A3 at a position that deviates from the tilt axis A3. The main body 23 is located between the pair of pivots 21 and 22 in the direction along the tilt axis A3. The pair of pivots 21 and 22 are respectively connected to both end portions of the main body 23 in the direction along the tilt axis A3. To be specific, the pair of pivots 21 and 22 respectively stand at both end portions of the main body 23 in the direction along the tilt axis A3 so as to project in a direction perpendicular to the tilt axis A3. The trunnion 20 forms a roller accommodating space 20a that is located between the pair of pivots 21 and 22 in the direction along the tilt axis A3 and surrounded by the pair of pivots 21 and 22 and the main body 23. The roller accommodating space 20a accommodates the support 18 and the power roller 16. Hereinafter, one of the pivots 21 and 22 is referred to as a "first pivot 21," and the other is referred to as a "second pivot 22."

The first pivot 21 is fitted in a through hole 29 of a first yoke 27 through a bearing 25, and the second pivot 22 is fitted in a through hole 30 of a second yoke 28 through a bearing 26. The pair of yokes 27 and 28 are attached to the casing 2 (see FIG. 1). The trunnion 20 is supported by the casing 2 through the yokes 27 and 28 so as to be rotatable (swingable, tiltable, or angularly displaceable) about the tilt axis A3 and movable in the direction along the tilt axis A3. As above, the pair of pivots 21 and 22 are journals inserted into the bearings 25 and 26 and are fitted in the pair of yokes 27 and 28 (together with the bearings 25 and 26).

The yoke 27 includes the through holes 29, the number of which is equal to the total number of trunnions 20, and the yoke 28 includes the through holes 30, the number of which is equal to the total number of trunnions 20. Each of all the trunnions 20 is supported by the first yoke 27 at one side in the direction along the tilt axis A3 and supported by the second yoke 28 at the other side in the direction along the tilt axis A3 such that the tilt axes A3 of the trunnions 20 are parallel to each other.

The trunnion 20 and the power roller 16 attached thereto through the support 18 are driven by a hydraulic drive mechanism 31 of the IDG 1 so as to move in the direction along the tilt axis A3. For example, the hydraulic drive mechanism 31 includes hydraulic cylinders 32 corresponding to the trunnions 20 one to one.

Each of the hydraulic cylinders 32 includes a cylinder main body 33, a piston 34, and a rod 35. The cylinder main body 33 is fixed to a connection surface 36 orthogonal to the tilt axis A3. The connection surface 36 is arranged at an opposite side of the transmission center axis A1 across the first yoke 27 in the direction along the tilt axis A3, and the cylinder main body 33 is arranged at an opposite side of the first yoke 27 across the connection surface 36 in the direction along the tilt axis A3. The hydraulic cylinder 32 is of, for example, a double acting single rod type. The piston 34 is arranged in an internal space of the cylinder main body 33 so as to be reciprocatable in the direction along the tilt axis A3, and the internal space is divided into two oil chambers 33a and 33b by the piston 34. A first end portion of the rod 35 is fixed to the piston 34, and a second end portion of the rod 35 is fixed to the first pivot 21. The oil stored in the casing 2 (see FIG. 1) is supplied to the oil chambers 33a and 33b as the operating oil of the hydraulic drive mechanism 31. The piston 34 moves in the direction along the tilt axis A3 in accordance with the hydraulic pressure supplied to the oil chambers 33a and 33b, and the rod 35 advances or retreats in the direction along the tilt axis A3 in accordance with the operation of the piston 34. The trunnion 20, the support 18, and the power roller 16 move in the direction along the tilt axis A3 in association with each other, and this continuously changes the tilt angle and the change gear ratio of the transmission 10.

Hereinafter, the trunnion 20 and its peripheral structure will be described with reference to FIG. 3.

The support 18 and the power roller 16 are accommodated in the roller accommodating space 20a of the trunnion 20 so as to be opposed to each other in the direction along the rotation axis A2. With the power roller 16 attached to the trunnion 20 through the support 18, the direction along the rotation axis A2 of the power roller 16 and a direction in which the pivots 21 and 22 project coincide with each other.

As described above, the support 18 is arranged between the trunnion 20 and the power roller 16 in the direction along the rotation axis A2 of the power roller 16. To be specific, the support 18 includes: an opposing surface 54 opposed to the power roller 16 in the direction along the rotation axis A2; and an opposing surface 55 that is an opposite surface of the opposing surface 54 and is opposed to the main body 23 of the trunnion 20 in the direction along the rotation axis A2.

In the following description, for convenience sake, the opposing surface 55 opposed to the main body 23 of the trunnion 20 out of the opposing surfaces 54 and 55 of the support 18 is referred to as an "outer surface 55" of the support 18. Moreover, among surfaces of the main body 23 of the trunnion 20, a surface that faces the roller accommodating space 20a and is opposed to the outer surface 55 of the support 18 in the direction along the rotation axis A2 is referred to as an "inner surface 61" of the main body 23 of the trunnion 20.

Figure 3:
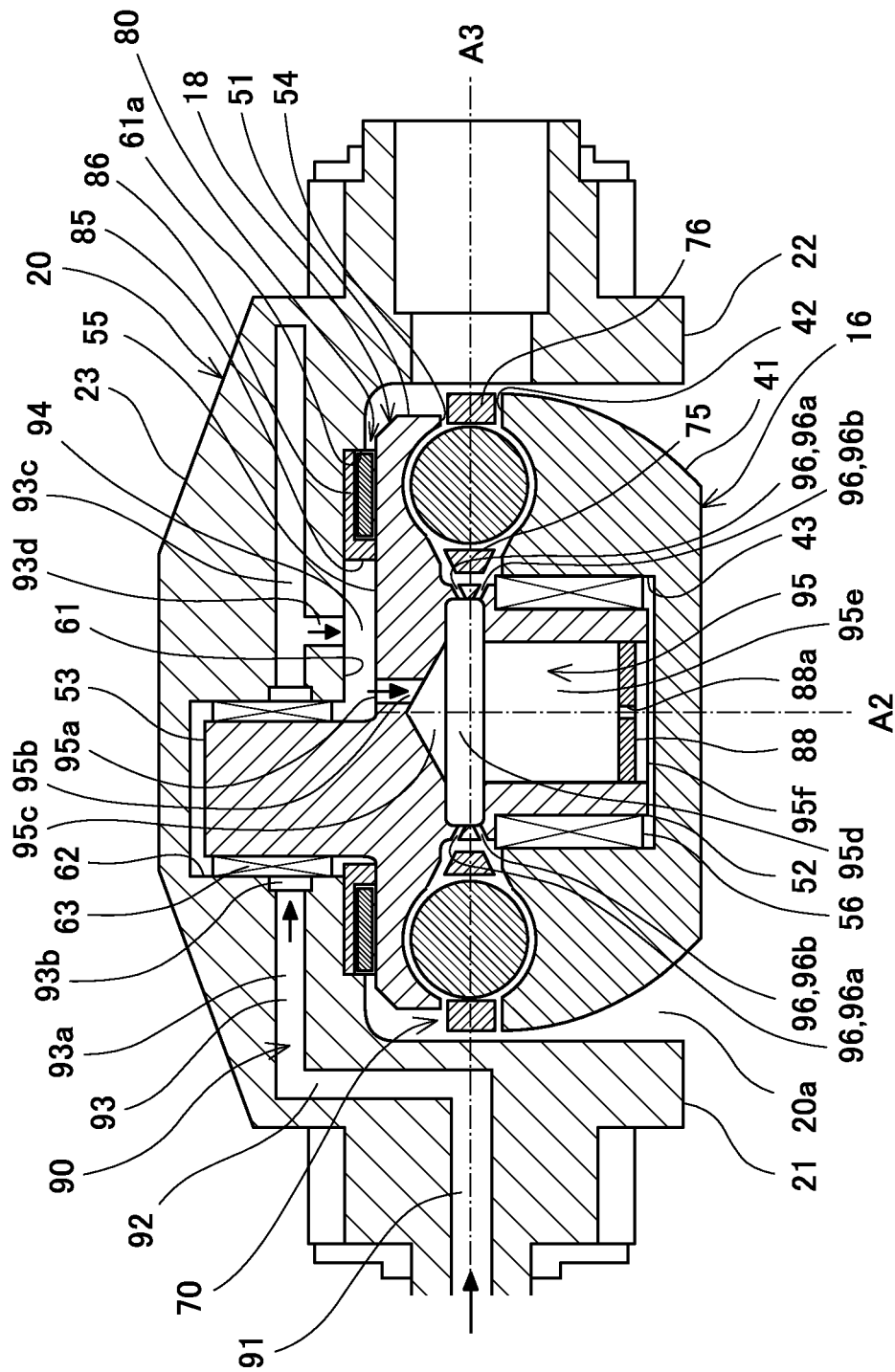
FIG. 3 is a sectional view showing a power roller and a trunnion in Embodiment 1.

As shown in FIG. 3, the power roller 16 has a substantially semispherical shape and includes a curved peripheral surface 41 and an opposing surface 42 opposed to the support 18 (more specifically, the above opposing surface 54) in the direction along the rotation axis A2. The opposing surface 42 includes a circular hole 43. The circular hole 43 is a non-through hole and extends in the direction along the rotation axis A2.

The support 18 includes a disc-shaped flange 51, a spindle 52, and an attaching shaft 53. The spindle 52 and the attaching shaft 53 extend from the flange 51 in respective directions opposite to each other. The flange 51 includes the above opposing surface 54 and the above outer surface 55.

The spindle 52 extends from the opposing surface 54 of the flange 51 toward the power roller 16 in the direction along the rotation axis A2 and is inserted into the circular hole 43 of the power roller 16. A center line of the spindle 52 and a center line of the circular hole 43 are located on the same straight line and constitute the rotation axis A2.

A radial bearing 56 (for example, a radial needle roller bearing 56) is interposed between the spindle 52 and an inner peripheral surface of the circular hole 43. The radial bearing 56 receives a load in a direction orthogonal to the spindle 52. Moreover, an annular first thrust bearing 70 is interposed between the opposing surface 42 of the power roller 16 and the opposing surface 54 of the support 18. The first thrust bearing 70 receives a load of the rotating power roller 16 in the direction along the rotation axis A2. The power roller 16 is supported by the radial bearing 56 and the first thrust bearing 70 so as to be rotatable relative to the support 18. A specific configuration of the first thrust bearing 70 will be described later.

The attaching shaft 53 extends in the direction along the rotation axis A2 toward the main body 23 from a position of the outer surface 55 of the flange 51 which position deviates from the rotation axis A2. The inner surface 61 of the main body 23 includes an attachment hole 62 that is a non-through hole and extends in the direction along the rotation axis A2. The attaching shaft 53 is inserted into the attachment hole 62 so as to be rotatable. For example, when viewed from the tilt axis A3, the attachment hole 62 may located at a position that deviates from the tilt axis A3 toward one side in a direction orthogonal to both the tilt axis A3 and the rotation axis A2. When the attaching shaft 53 is inserted into the attachment hole 62, the power roller 16 supported by the support 18 is arranged in the roller accommodating space 20a.

A radial bearing 63 (for example, a radial needle roller bearing) is interposed between the attaching shaft 53 and an inner peripheral surface of the attachment hole 62. The radial bearing 63 receives a load in a direction orthogonal to the attaching shaft 53. Moreover, an annular second thrust bearing 80 is interposed between the inner surface 61 of the main body 23 and the outer surface 55 of the support 18. The second thrust bearing 80 receives a load of the support 18 in the direction along the rotation axis A2. The power roller 16 and the support 18 are supported by the radial bearing 63 and the second thrust bearing 80 so as to be movable relative to the trunnion 20. A specific configuration of the second thrust bearing 80 will be described later.

The transmission 10 includes an oil passage 90 through which the lubricating oil is supplied to the bearings 56, 63, 70, and 80. The oil passage 90 includes an inflow oil passage 91, a pivot oil passage 92, a main body oil passage 93, a main body-roller oil chamber (hereinafter simply referred to as an "oil chamber") 94, a penetrating oil passage 95, and nozzles 96. The pivot oil passage 92 and the main body oil passage 93 are formed inside the trunnion 20 and constitute a trunnion oil passage.

The inflow oil passage 91 is formed inside the rod 35 and extends along the tilt axis A3 in the direction along the tilt axis A3. The inflow oil passage 91 communicates with the pivot oil passage 92 in the first pivot 21. The pivot oil passage 92 is formed inside the first pivot 21 and extends in a direction orthogonal to the tilt axis A3. For example, the pivot oil passage 92 may extend in parallel with the direction along the rotation axis A2 or may extend obliquely to the direction along the rotation axis A2. The pivot oil passage 92 communicates with the main body oil passage 93 at an end portion opposite to an end portion connected to the inflow oil passage 91.

The main body oil passage 93 is formed inside the main body 23 and includes a first main body oil passage 93a, an annular main body oil passage 93b, a second main body oil passage 93c, and a branch main body oil passage 93d. The first main body oil passage 93a extends inside the main body 23 in the direction along the tilt axis A3. A first end portion of the first main body oil passage 93a communicates with the pivot oil passage 92, and a second end portion of the first main body oil passage 93a communicates with the annular main body oil passage 93b.

The annular main body oil passage 93b is formed on the inner peripheral surface of the attachment hole 62 so as to have an annular shape along a circumferential direction of the attachment hole 62. The annular main body oil passage 93b faces an outer peripheral surface of the bearing 63. The annular main body oil passage 93b communicates with the second main body oil passage 93c at a portion close to the second pivot 22. Part of the oil supplied to the annular main body oil passage 93b is supplied as the lubricating oil to the bearing 63, and the rest of the oil, i.e., most of the oil is supplied to the second main body oil passage 93c. The oil supplied to the bearing 63, i.e., the oil in the attachment hole 62 is supplied to the below-described oil chamber 94.

The second main body oil passage 93c extends inside the main body 23 in the direction along the tilt axis A3. A first end portion of the second main body oil passage 93c communicates with the annular main body oil passage 93b, and a second end portion of the second main body oil passage 93c is closed inside the second pivot 22. The branch main body oil passage 93d extends from a portion of the second main body oil passage 93c in the direction along the rotation axis A2 (i.e., the direction in which the pivots 21 and 22 project) and is open toward the oil chamber 94 that faces the inner surface 61 of the main body 23.

The oil chamber 94 is formed between the outer surface 55 of the support 18 and the inner surface 61 of the trunnion 20. The oil is supplied to the oil chamber 94 through the pivot oil passage 92 and the main body oil passage 93 which constitute the trunnion oil passage. The oil chamber 94 is arranged at a radially inner side of the second thrust bearing 80.

An inflow opening 95a of the penetrating oil passage 95 is formed at a position of the outer surface 55 of the support 18 which position is in the vicinity of the rotation axis A2. The inflow opening 95a is open toward the oil chamber 94. Most of the oil supplied to the oil chamber 94 through the trunnion oil passage flows into the inflow opening 95a of the penetrating oil passage 95, and the rest of the oil is supplied as the lubricating oil to the second thrust bearing 80 toward a radially outer side of the rotation axis A2.

The amount of oil supplied to the second thrust bearing 80 is adjusted by a baffle plate 85. The baffle plate 85 is disposed at a radially outer side of the oil chamber 94 and a radially inner side of a second retainer 82.

Figure 4:
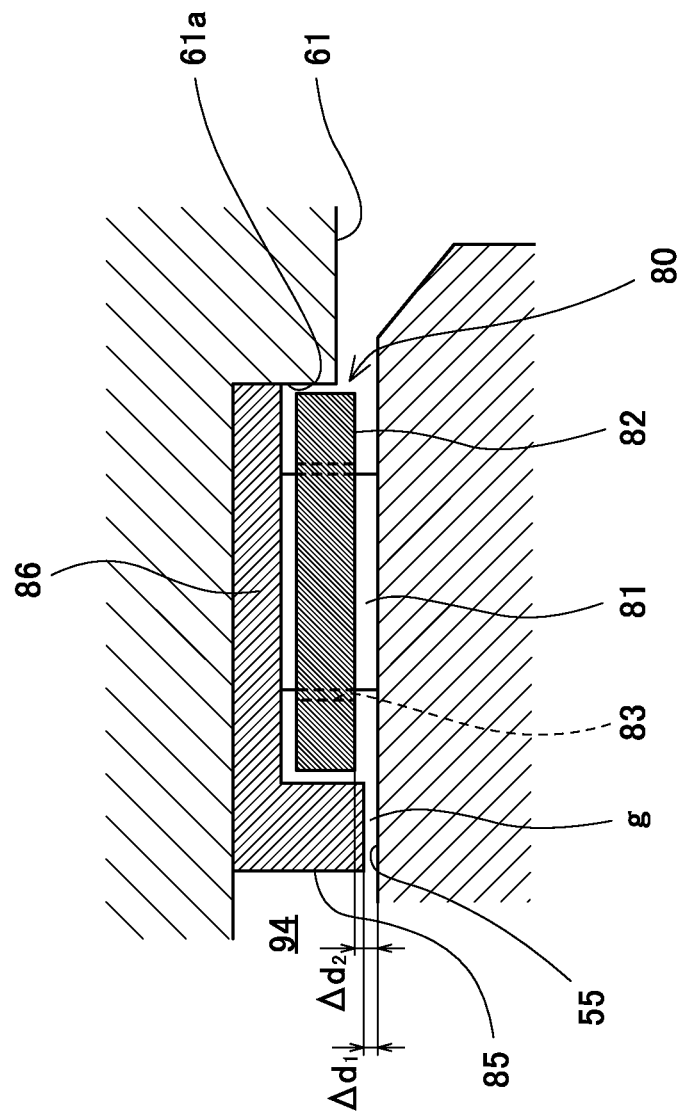
FIG. 4 is an enlarged sectional view showing a second thrust bearing and a baffle plate shown in FIG. 3.

The second thrust bearing 80 and its peripheral structure will be described with reference to FIG. 4. FIG. 4 is an enlarged sectional view showing that part of the second thrust bearing 80 is cut in the direction along the rotation axis A2. The second thrust bearing 80 includes: second rolling elements 81 lined up in a rotational direction of the power roller 16; and the annular second retainer 82 that holds the second rolling elements 81. The oil chamber 94 is arranged at a radially inner side of the second retainer 82. In the present embodiment, the second rolling elements 81 are columnar rollers. The second retainer 82 is an annular member including surfaces parallel to each other. The second retainer 82 is arranged such that a center line thereof coincides with the rotation axis A2. The second retainer 82 includes second retaining holes 83 that respectively hold the second rolling elements 81. Each of the second retaining holes 83 has a substantially rectangular shape in a plan view.

The baffle plate 85 is arranged between the support 18 and the trunnion 20 and is disposed around the rotation axis A2. An annular shim 86 against which the second rolling elements 81 are pressed is disposed on the inner surface 61 of the main body 23. The baffle plate 85 projects at an inner edge of the shim 86. The attaching shaft 53 is inserted into a space located at a radially inner side of the shim 86 and the baffle plate 85. In the present embodiment, the baffle plate 85 is cylindrical and is arranged such that a center line thereof coincides with the rotation axis A2. Moreover, in the present embodiment, the baffle plate 85 and the shim 86 are formed integrally.

The inner surface 61 of the trunnion 20 includes a circular groove 61a that is substantially the same in size as an outer edge of the shim 86 (see also FIG. 3). When the shim 86 is fitted in the groove 61a, the shim 86 and the baffle plate 85 are fixed to the trunnion 20. As shown in FIG. 4, with the support 18 attached to the trunnion 20, a gap g having a distance $\Delta d1$ exists between the baffle plate 85 and the outer surface 55 of the support 18 in the direction along the rotation axis A2. Part of the oil of the oil chamber 94 is supplied to the second thrust bearing 80 through the gap g.

The distance $\Delta d1$ of the gap g is smaller than a difference between a thickness of the second rolling element 81 in the direction along the rotation axis A2 (i.e., a diameter of the roller 81) and a thickness of the second retainer 82 in the direction along the rotation axis A2. Moreover, it is preferable that the distance $\Delta d1$ of the gap g be equal to or less than half the difference between the thickness of the second rolling element 81 in the direction along the rotation axis A2 and the thickness of the second retainer 82 in the direction along the rotation axis A2. In other words, it is preferable that as shown in FIG. 4, the distance $\Delta d1$ of the gap g be smaller than a distance $\Delta d2$ between the second retainer 82 and the outer surface 55 of the support 18 in a state where a center line of the thickness of the second retainer 82 coincides with a center line of the second rolling element 81 in the direction along the rotation axis A2. In the present embodiment, the distance $\Delta d1$ of the gap g falls within a range of, for example, 100 μm or less. The oil supplied to the second thrust bearing 80 through the gap g cools the second thrust bearing 80 and then flows out toward a radially outer side of the second thrust bearing 80.

The shim 86 serves as a member that adjusts the position of the power roller 16 relative to the trunnion 20. To be specific, a distance from the inner surface 61 of the main body 23 of the trunnion 20 to the outer surface 55 of the support 18 can be adjusted by the thickness of the shim 86, and therefore, a contact position between the disc 13 and the power roller 16 and a contact position between the disc 14 and the power roller 6 can be easily adjusted.

Referring back to FIG. 3, the penetrating oil passage 95 is formed inside the support 18. The penetrating oil passage 95 penetrates an inside of the support 18 in the direction along the rotation axis A2. Specifically, the penetrating oil passage 95 extends in the direction along the rotation axis A2 from the inflow opening 95a of the outer surface 55 of the support 18 to an outflow opening 95f of an end surface of the spindle 52. The penetrating oil passage 95 includes a small-diameter passage portion 95b, an enlarged-diameter passage portion 95c, a large-diameter passage portion 95d, and a middle-diameter passage portion 95e in this order in a direction from the inflow opening 95a toward the outflow opening 95f.

The small-diameter passage portion 95b extends in parallel with the rotation axis A2 at a position that deviates from the rotation axis A2. The small-diameter passage portion 95b is substantially columnar and includes a center line that is parallel to the rotation axis A2 and deviates from the rotation axis A2. The inflow opening 95a is located at a first end portion of the small-diameter passage portion 95b, and the enlarged-diameter passage portion 95c is connected to a second end portion of the small-diameter passage portion 95b.

The enlarged-diameter passage portion 95c is substantially conical. A center line of the enlarged-diameter passage portion 95c and the rotation axis A2 are located on the same straight line. The enlarged-diameter passage portion 95c increases in diameter as it approaches the outflow opening 95f. The second end portion of the small-diameter passage portion 95b is connected to the vicinity of a first end portion of the enlarged-diameter passage portion 95c, and a first end portion of the large-diameter passage portion 95d is connected to a second end portion of the enlarged-diameter passage portion 95c.

The large-diameter passage portion 95d is substantially columnar. A center line of the large-diameter passage portion 95d and the rotation axis A2 are located on the same straight line. A diameter of the large-diameter passage portion 95d is larger than a diameter of the small-diameter passage portion 95b. The second end portion of the enlarged-diameter passage portion 95c is connected to the first end portion of the large-diameter passage portion 95d, and a first end portion of the middle-diameter passage portion 95e is connected to a second end portion of the large-diameter passage portion 95d.

The middle-diameter passage portion 95e is substantially columnar. A center line of the middle-diameter passage portion 95e and the rotation axis A2 are located on the same straight line. A diameter of the middle-diameter passage portion 95e is larger than the diameter of the small-diameter passage portion 95b and smaller than the diameter of the large-diameter passage portion 95d. The second end portion of the large-diameter passage portion 95d is connected to the first end portion of the middle-diameter passage portion 95e. The outflow opening 95f is located at a second end portion of the middle-diameter passage portion 95e.

The nozzles 96 communicate with the penetrating oil passage 95. The nozzles 96 are oil passages extending from the penetrating oil passage 95. The nozzles 96 extend from the penetrating oil passage 95 (more specifically, the large-diameter passage portion 95d) toward a radially outer side.

The nozzles 96 are located between the opposing surface 42 of the power roller 16 and the opposing surface 54 of the support 18 in the direction along the rotation axis A2 and at a radially inner side of the first thrust bearing 70 (more specifically, a below-described first retainer 72). The nozzles 96 define a flow direction of the lubricating oil flowing toward the first thrust bearing 70. The nozzles 96 include first nozzles 96a and second nozzles 96b arranged at positions closer to the power roller 16 than the first nozzles 96a.

The first nozzles 96a are arranged so as to be lined up in a circumferential direction about the rotation axis A2 at equal intervals. Each of the first nozzles 96a is linear and extends obliquely to a direction orthogonal to the rotation axis A2. Specifically, each of the first nozzles 96a extends toward the opposing surface 54 of the support 18. In other words, each of the first nozzles 96a extends so as to approach the support 18 as it extends toward a radially outer side.

The second nozzles 96b and the first nozzles 96a are arranged symmetrically across a plane orthogonal to the rotation axis A2. The second nozzles 96b are arranged so as to be lined up in the circumferential direction about the rotation axis A2 at equal intervals. Each of the second nozzles 96b is linear and extends obliquely to the direction orthogonal to the rotation axis A2. Specifically, each of the second nozzles 96b extends toward the opposing surface 42 of the power roller 16. In other words, each of the second nozzles 96b extends so as to approach the power roller 16 as it extends toward a radially outer side.

The first nozzles 96a supply the lubricating oil at a high flow velocity to a portion where a large amount of heat is generated between the first thrust bearing 70 and the support 18. The second nozzles 96b supply the lubricating oil at a high flow velocity to a portion where a large amount of heat is generated between the first thrust bearing 70 and the power roller 16.

Figure 5:
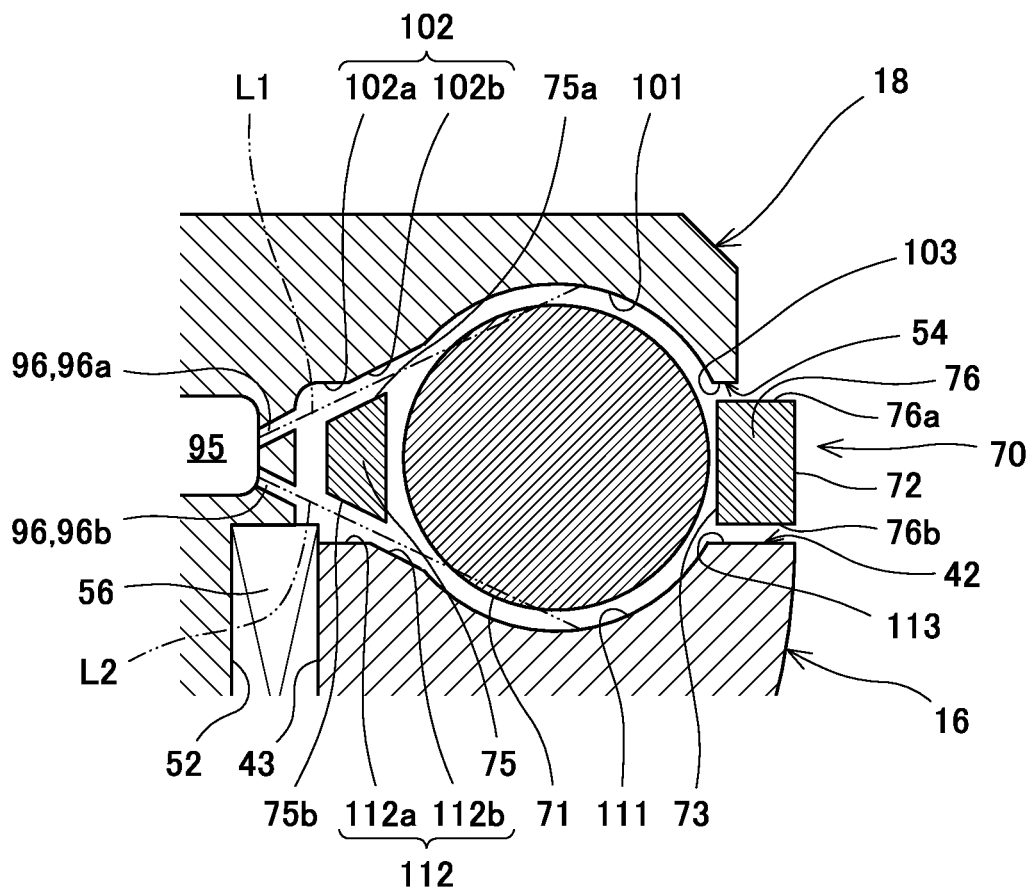
FIG. 5 is an enlarged sectional view showing the vicinity of a first thrust bearing shown in FIG. 3.

FIG. 5 is an enlarged sectional view showing the vicinity of the first thrust bearing 70 shown in FIG. 3. The first thrust bearing 70 includes first rolling elements 71 and the first retainer 72 that holds the first rolling elements 71.

The first rolling elements 71 are arranged between the power roller 16 and the support 18 and are lined up in an annular shape in the circumferential direction about the rotation axis A2. Each of the first rolling elements 71 is spherical. Each of the first rolling elements 71 is arranged between a first bearing groove 101 formed on the opposing surface 54 of the support 18 and a second bearing groove 111 formed on the opposing surface 42 of the power roller 16. Each of the first rolling elements 71 is held by the first bearing groove 101 and the second bearing groove 111 so as to be rollable. Each of the first bearing groove 101 and the second bearing groove 111 is formed in an annular shape about the rotation axis A2 and is continuous in the circumferential direction of the rotation axis A2. Each of a section of the first bearing groove 101 and a section of the second bearing groove 111 which sections are parallel to the rotation axis A2 has a circular-arc shape.

Figure 6:
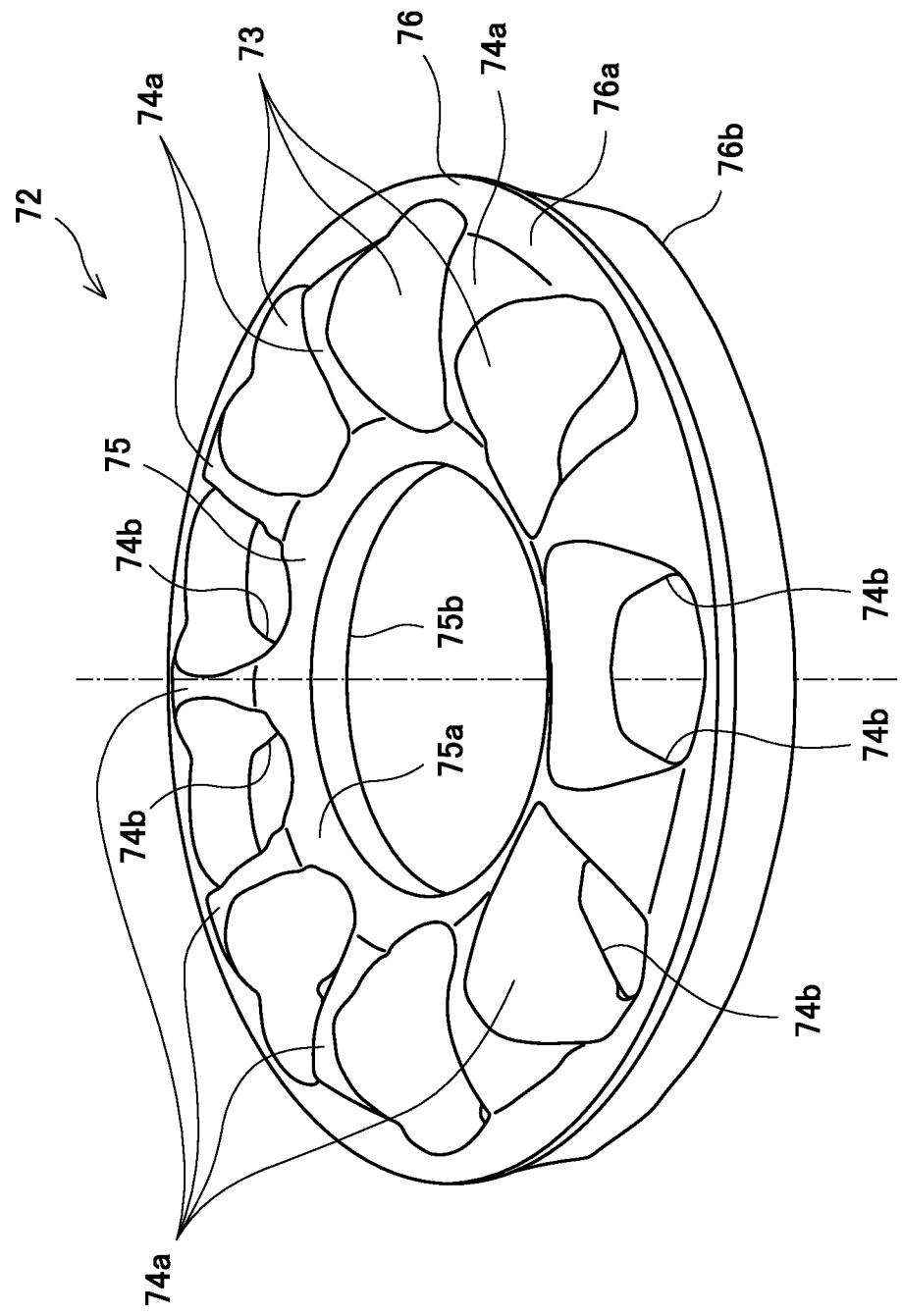
FIG. 6 is a perspective view showing a retainer of the first thrust bearing shown in FIG. 3.

FIG. 6 is a perspective view showing the first retainer 72 of the first thrust bearing 70 shown in FIG. 3. The first retainer 72 includes first retaining holes 73 where the first rolling elements 71 are respectively arranged and held. The first retaining holes 73 are arranged so as to be lined up in a circumferential direction about a center line C of the first retainer 72 at equal intervals. Each of the first retaining holes 73 has a circular shape in a plan view.

The first retainer 72 includes first swelling portions 74a and second swelling portions 74b. Each of the first swelling portion 74a and the second swelling portion 74b is arranged between the two first retaining holes 73 adjacent to each other in the circumferential direction. The first swelling portions 74a and the second swelling portions 74b are arranged symmetrically across a plane orthogonal to the center line C of the first retainer 72 and swell in respective directions opposite to each other. The first swelling portions 74a swell toward one side in a direction along the center line C, and the second swelling portions 74b swell toward the other side in the direction along the center line C.

Moreover, an inner peripheral portion 75 of the first retainer 72 is a portion located at a radially inner side of the first retaining holes 73 and includes: an inclined surface 75a facing the support 18; and an inclined surface 75b facing the power roller 16 (see also FIG. 5). Each of the inclined surface 75a and the inclined surface 75b is inclined obliquely to the plane orthogonal to the center line C of the first retainer 72. The inclined surface 75a and the inclined surface 75b are inclined so as to approach each other as they extend toward a radially inner side of the first retainer 72. More specifically, as shown in FIG. 5, when the center line C of the first retainer 72 and the rotation axis A2 coincide with each other, a section of the inclined surface 75a taken along the rotation axis A2 is substantially parallel to a direction in which the first nozzle 96a extends. Moreover, as shown in FIG. 5, when the center line C of the first retainer 72 and the rotation axis A2 coincide with each other, a section of the inclined surface 75b taken along the rotation axis A2 is substantially parallel to a direction in which the second nozzle 96b extends.

Moreover, an outer peripheral portion 76 of the first retainer 72 is a portion located at a radially outer side of the first retaining holes 73 and includes: a parallel surface 76a facing the support 18; and a parallel surface 76b facing the power roller 16. The parallel surface 76a and the parallel surface 76b are surfaces parallel to each other. Moreover, as shown in FIG. 5, when the center line C of the first retainer 72 and the rotation axis A2 coincide with each other, each of the parallel surface 76a and the parallel surface 76b is parallel to the plane orthogonal to the rotation axis A2.

As shown in FIG. 5, the opposing surface 54 of the support 18 includes: a first inner groove shoulder portion 102 that is a portion located at a radially inner side of the first bearing groove 101; and a first outer groove shoulder portion 103 that is a portion located at a radially outer side of the first bearing groove 101.

A virtual axis L1 of a discharge port of the first nozzle 96a extends in the flow direction of the oil of the first nozzle 96a and reaches the first bearing groove 101. The first inner groove shoulder portion 102 is formed so as not to contact the virtual axis L1 of the discharge port of the first nozzle 96a.

Specifically, the first inner groove shoulder portion 102 includes: a parallel surface 102a parallel to the plane orthogonal to the rotation axis A2; and an inclined surface 102b inclined relative to the parallel surface 102a. The parallel surface 102a is formed in an annular shape around the spindle 52. The inclined surface 102b is located at a radially outer side of the parallel surface 102a and at a radially inner side of the first bearing groove 101. The inclined surface 102b is formed in an annular shape around the parallel surface 102a and connects the parallel surface 102a and the first bearing groove 101 in the radial direction.

When viewed from a direction perpendicular to the direction along the rotation axis A2 (more specifically, when viewed from a direction perpendicular to both the rotation axis A2 and the virtual axis L1), the first inner groove shoulder portion 102 is located at an opposite side of the inner peripheral portion 75 of the first retainer 72 across the virtual axis L1. In other words, in a section shown in FIG. 5, i.e., a section obtained when the power roller 16 and the support 18 accommodated in the roller accommodating space 20a are cut along the virtual axis L1 and a plane parallel to the virtual axis L1 and the rotation axis A2, the first inner groove shoulder portion 102 is located at an opposite side of the inner peripheral portion 75 of the first retainer 72 across the virtual axis L1.

As above, when viewed from the direction perpendicular to the direction along the rotation axis A2, the inner peripheral portion 75 of the first retainer 72 and the first inner groove shoulder portion 102 are located away from the virtual axis L1 at respective sides opposite to each other across the virtual axis L1. Therefore, the virtual axis L1 reaches the first bearing groove 101 without contacting the inner peripheral portion 75 and the first inner groove shoulder portion 102. To be specific, the virtual axis L1 reaches a contact portion between the first bearing groove 101 and the first rolling element 71.

Moreover, the first outer groove shoulder portion 103 is a surface orthogonal to the rotation axis A2. The parallel surface 102a of the first inner groove shoulder portion 102 and the first outer groove shoulder portion 103 are located at the same position in the direction along the rotation axis A2. Therefore, the parallel surface 102a of the first inner groove shoulder portion 102 and the first outer groove shoulder portion 103 can be machined so as to be formed simultaneously, and therefore, the support 18 (more specifically, the opposing surface 54) is easily machined.

Moreover, the opposing surface 42 of the power roller 16 includes: a second inner groove shoulder portion 112 that is a portion located at a radially inner side of the second bearing groove 111; and a second outer groove shoulder portion 113 that is a portion located at a radially outer side of the second bearing groove 111.

A virtual axis L2 of a discharge port of the second nozzle 96b extends in the flow direction of the oil of the second nozzle 96b and reaches the second bearing groove 111. The second inner groove shoulder portion 112 is formed so as not to contact the virtual axis L2 of the discharge port of the second nozzle 96b.

Specifically, the second inner groove shoulder portion 112 includes: a parallel surface 112a parallel to the plane orthogonal to the rotation axis A2; and an inclined surface 112b inclined relative to the parallel surface 112a. The parallel surface 112a is formed in an annular shape around the circular hole 43. The inclined surface 112b is located at a radially outer side of the parallel surface 112a and at a radially inner side of the second bearing groove 111. The inclined surface 112b is formed in an annular shape around the parallel surface 112a and connects the parallel surface 112a and the second bearing groove 111 in the radial direction.

When viewed from the direction perpendicular to the direction along the rotation axis A2 (more specifically, when viewed from the direction perpendicular to both the rotation axis A2 and the virtual axis L1), the second inner groove shoulder portion 112 is located at an opposite side of the inner peripheral portion 75 of the first retainer 72 across the virtual axis L2. In other words, in a section shown in FIG. 5, i.e., a section obtained when the power roller 16 and the support 18 accommodated in the roller accommodating space 20a are cut along the virtual axis L2 and a plane parallel to the virtual axis L2 and the rotation axis A2, the second inner groove shoulder portion 112 is located at an opposite side of the inner peripheral portion 75 of the first retainer 72 across the virtual axis L2.

As above, when viewed from the direction perpendicular to the direction along the rotation axis A2, the inner peripheral portion 75 of the first retainer 72 and the second inner groove shoulder portion 112 are located away from the virtual axis L2 at respective sides opposite to each other across the virtual axis L2. Therefore, the virtual axis L2 reaches the second bearing groove 111 without contacting the inner peripheral portion 75 and the second inner groove shoulder portion 112. To be specific, the virtual axis L2 reaches a contact portion between the second bearing groove 111 and the first rolling element 71.

Moreover, the second outer groove shoulder portion 113 is a surface orthogonal to the rotation axis A2. The parallel surface 112a of the second inner groove shoulder portion 112 and the second outer groove shoulder portion 113 are located at the same position in the direction along the rotation axis A2. Therefore, the parallel surface 112a of the second inner groove shoulder portion 112 and the second outer groove shoulder portion 113 can be machined so as to be formed simultaneously, and therefore, the power roller 16 (more specifically, the opposing surface 42) is easily machined.

When the first retainer 72 moves toward the support 18, the first swelling portions 74a and the parallel surface 76a of the first retainer 72 respectively contact the first bearing groove 101 and the first outer groove shoulder portion 103. Moreover, when the first retainer 72 moves toward the power roller 16, the second swelling portions 74b and the parallel surface 76b of the first retainer 72 respectively contact the second bearing groove 111 and the second outer groove shoulder portion 113.

To be specific, a range where the first retainer 72 moves in the direction along the rotation axis A2 between the opposing surface 42 of the power roller 16 and the opposing surface 54 of the support 18 is limited by the first swelling portions 74a, the second swelling portions 74b, the first outer groove shoulder portion 103, and the second outer groove shoulder portion 113. In other words, the first retainer 72 is guided by the first bearing groove 101, the second bearing groove 111, the first outer groove shoulder portion 103, and the second outer groove shoulder portion 113.

Moreover, an insertion plug 88 is disposed in the penetrating oil passage 95 as a closing member that partially closes a flow path of the penetrating oil passage 95. The insertion plug 88 is inserted into the penetrating oil passage 95 through the outflow opening 95f of the penetrating oil passage 95. The insertion plug 88 is substantially columnar. The insertion plug 88 is fitted to the middle-diameter passage portion 95e of the penetrating oil passage 95 and fixed to the penetrating oil passage 95. The insertion plug 88 includes a through hole 88a on a center line thereof. Part of the oil flowing through the inflow opening 95a into the penetrating oil passage 95 flows into the nozzles 96, and the rest of the oil passes through the through hole 88a and flows out from the outflow opening 95f. The oil flowing out from the outflow opening 95f is supplied as the lubricating oil to the radial bearing 56 arranged in the circular hole 43 and is then supplied to the first thrust bearing 70 through gaps of the radial bearing 56.

As described above, according to the toroidal continuously variable transmission 10 of the present embodiment, the virtual axis L1 of the discharge port of the first nozzle 96a extends in the flow direction of the first nozzle 96a and reaches the first bearing groove 101 without contacting the inner peripheral portion 75 of the first retainer 72 and the first inner groove shoulder portion 102 of the support 18. Therefore, the lubricating oil discharged from the first nozzle 96a reaches the first bearing groove 101 while avoiding a decrease in the flow velocity due to collision with obstacles, such as the inner peripheral portion 75 of the first retainer 72. With this, the lubricating oil can be supplied at a high flow velocity to a portion of the first thrust bearing 70 where a large amount of heat is generated, and therefore, a large amount of heat can be removed from the heat generating portion by a relatively small amount of lubricating oil. On this account, cooling efficiency of the first thrust bearing 70 by the lubricating oil can be improved.

Moreover, since the virtual axis L1 reaches a contact portion between the first bearing groove 101 and the first rolling element 71 without contacting the inner peripheral portion 75 of the first retainer 72 and the first inner groove shoulder portion 102 of the support 18, the cooling efficiency of the first thrust bearing 70 by the lubricating oil can be further improved.

Moreover, in the present embodiment, the virtual axis L2 of the discharge port of the second nozzle 96b extends in the flow direction of the second nozzle 96b and reaches the second bearing groove 111 without contacting the inner peripheral portion 75 of the first retainer 72 and the second inner groove shoulder portion 112 of the power roller 16. Therefore, the lubricating oil discharged from the second nozzle 96b reaches the second bearing groove 111 while avoiding a decrease in the flow velocity due to collision with obstacles, such as the inner peripheral portion 75 of the first retainer 72. With this, the lubricating oil can be supplied at a high flow velocity to a portion of the first thrust bearing 70 where a large amount of heat is generated, and therefore, a large amount of heat can be removed from the heat generating portion by a relatively small amount of lubricating oil. On this account, the cooling efficiency of the first thrust bearing 70 by the lubricating oil can be improved.

Moreover, since the virtual axis L2 reaches a contact portion between the second bearing groove 111 and the first rolling element 71 without contacting the inner peripheral portion 75 of the first retainer 72 and the second inner groove shoulder portion 112 of the power roller 16, the cooling efficiency of the first thrust bearing 70 by the lubricating oil can be further improved.

Moreover, in the present embodiment, when the first retainer 72 moves toward the support 18, the first swelling portion 74a contacts the first bearing groove 101. Moreover, when the first retainer 72 moves toward the power roller 16, the second swelling portion 74b contacts the second bearing groove 111. Therefore, the position of the first retainer 72 in the direction along the rotation axis A2 can be kept within a predetermined range where the inner peripheral portion 75 of the first retainer 72 does not contact the virtual axes L1 and L2.

Moreover, in the present embodiment, the nozzles 96 are formed as oil passages extending from the penetrating oil passage 95 that penetrates the inside of the support 18 in the direction along the rotation axis A2. Therefore, a configuration in which the lubricating oil is supplied from the rotation axis A2 of the power roller 16 toward the first thrust bearing 70 can be easily realized.

Moreover, in the present embodiment, the baffle plate 85 is disposed between the support 18 and the trunnion 20 and at a radially outer side of the oil chamber 94 and a radially inner side of the second retainer 82. Therefore, the flow rate of the lubricating oil flowing from the oil chamber 94 toward the second thrust bearing 80 can be reduced by the baffle plate 85. With this, the pressure in the oil chamber 94 can be increased, and therefore, the pressure in the penetrating oil passage 95 can be increased. As a result, the flow velocity of the lubricating oil flowing out from the nozzle 96 toward the first thrust bearing 70 can be increased. Thus, the cooling efficiency of the first thrust bearing 70 can be further improved.

Moreover, in the present embodiment, the baffle plate 85 is disposed on the inner surface 61 of the trunnion 20 and projects at an inner edge of the annular shim 86 against which the second rolling elements 81 are pressed. Therefore, the baffle plate 85 can be easily fixed to the support 18.

Moreover, in the present embodiment, the closing member that partially closes the flow path of the penetrating oil passage 95 is disposed at the support 18. Therefore, the pressure in the penetrating oil passage 95 can be increased, and as a result, the flow velocity of the lubricating oil flowing out from the nozzles 96 toward the first thrust bearing 70 can be increased. With this, the cooling efficiency of the first thrust bearing 70 can be further improved.

Moreover, in the present embodiment, since the closing member that partially closes the flow path of the penetrating oil passage 95 is the insertion plug 88, the closing member can be easily disposed at the support 18.

Embodiment 2

Figure 7:
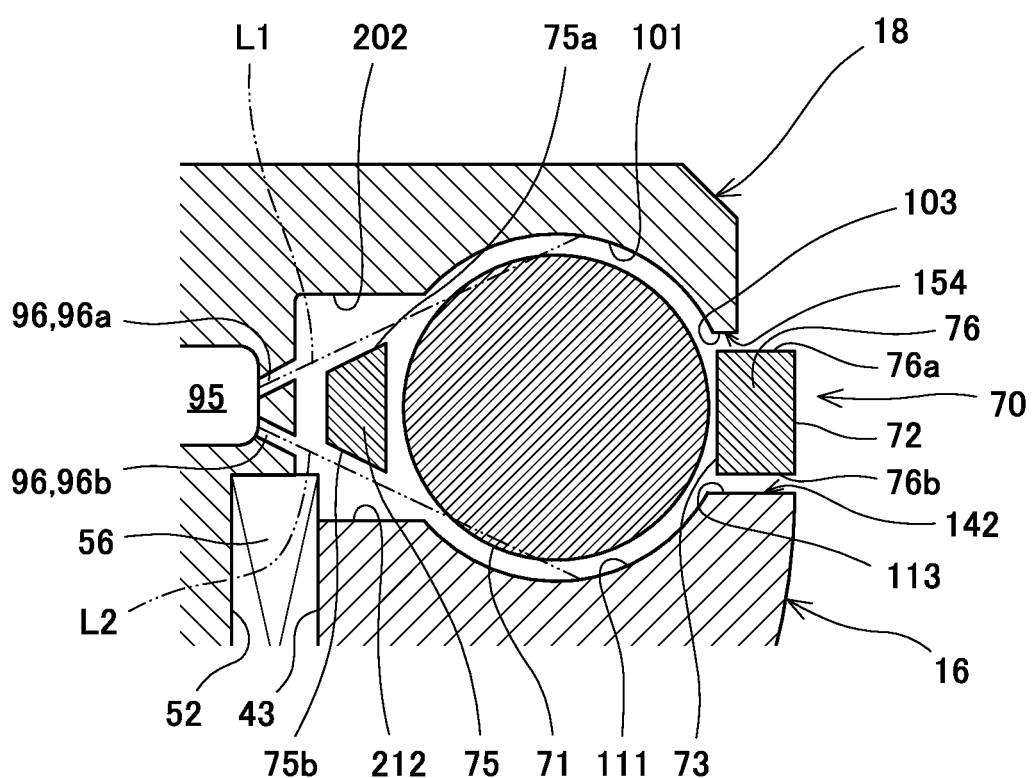
FIG. 7 is a sectional view showing the power roller and the trunnion in Embodiment 2.

Next, the transmission according to Embodiment 2 will be described with reference to FIG. 7. Embodiment 2 is the same as Embodiment 1 except for the shape of a first inner groove shoulder portion 202 of an opposing surface 154 of the support 18 and the shape of a second inner groove shoulder portion 212 of an opposing surface 142 of the power roller 16. Therefore, the following will describe only the first inner groove shoulder portion 202 and the second inner groove shoulder portion 212. The same reference signs are used for the common components to Embodiment 1, and the repetition of the same explanation is avoided.

In the present embodiment, as with Embodiment 1, the first inner groove shoulder portion 202 is formed so as not to contact the virtual axis L1, and the second inner groove shoulder portion 212 is formed so as not to contact the virtual axis L2. Each of the first inner groove shoulder portion 202 and the second inner groove shoulder portion 212 is constituted by a surface parallel to the plane orthogonal to the rotation axis A2.

Moreover, although the first inner groove shoulder portion 202 and the first outer groove shoulder portion 103 are parallel to each other, they are not located at the same position in the direction along the rotation axis A2. The first inner groove shoulder portion 202 is arranged at a position farther from the power roller 16 than the first outer groove shoulder portion 103 in the direction along the rotation axis A2. In other words, the first inner groove shoulder portion 202 is located at an opposite side of the power roller 16 across a plane that constitutes the first outer groove shoulder portion 103 and is orthogonal to the rotation axis A2. As above, the first outer groove shoulder portion 103 is arranged at such a position as to guide (possibly contact) the first retainer 72, and the first inner groove shoulder portion 202 is arranged at such a position as not to contact the virtual axis L1 of the discharge port of the first nozzle 96a.

Moreover, although the second inner groove shoulder portion 212 and the second outer groove shoulder portion 113 are parallel to each other, they are not located at the same position in the direction along the rotation axis A2. The second inner groove shoulder portion 212 is arranged at a position farther from the support 18 than the second outer groove shoulder portion 113 in the direction along the rotation axis A2. In other words, the second inner groove shoulder portion 212 is located at an opposite side of the support 18 across a plane that constitutes the second outer groove shoulder portion 113 and is orthogonal to the rotation axis A2. As above, the second outer groove shoulder portion 113 is arranged at such a position as to guide (possibly contact) the first retainer 72, and the second inner groove shoulder portion 212 is located at such a position as not to contact the virtual axis L2 of the discharge port of the second nozzles 96b.

The present embodiment can obtain the same effects as Embodiment 1.

Embodiment 3

Figure 8:
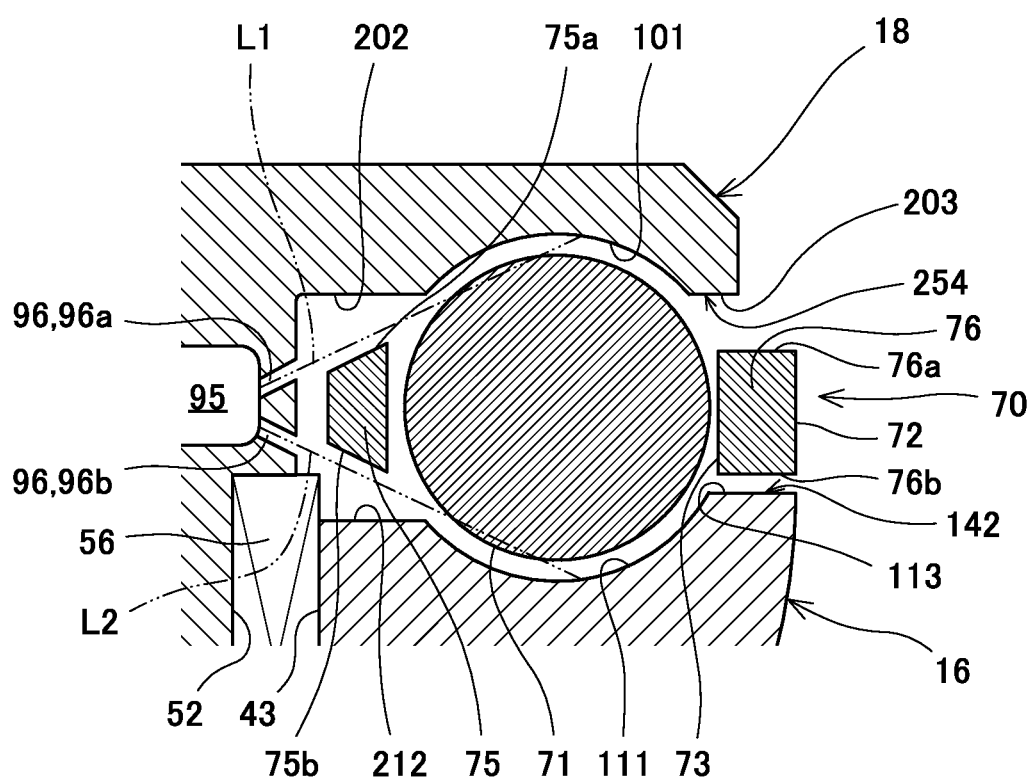
FIG. 8 is a sectional view showing the power roller and the trunnion in Embodiment 3.

Next, the transmission according to Embodiment 3 will be described with reference to FIG. 8. Embodiment 3 is the same as Embodiment 2 except for the shape of a first outer groove shoulder portion 203 of an opposing surface 254 of the support 18. Therefore, the following will describe only the first outer groove shoulder portion 203. The same reference signs are used for the common components to Embodiment 2, and the repetition of the same explanation is avoided.

As with the first outer groove shoulder portion 103 of Embodiment 2, the first outer groove shoulder portion 203 is a surface orthogonal to the rotation axis A2. The first outer groove shoulder portion 203 and the first inner groove shoulder portion 202 are located at the same position in the direction along the rotation axis A2. As above, as with the first inner groove shoulder portion 202, the first outer groove shoulder portion 203 is arranged at a position away from the power roller 16 in the direction along the rotation axis A2. Therefore, even when the first retainer 72 moves toward the support 18, the first outer groove shoulder portion 203 does not contact the first retainer 72. To be specific, although the first retainer 72 is guided by the first bearing groove 101 and the second bearing groove 111, it is not guided by the first outer groove shoulder portion 103 and the second outer groove shoulder portion 113.

The present embodiment can obtain the same effects as Embodiment 2. Moreover, the first inner groove shoulder portion 202 and the first outer groove shoulder portion 203 can be machined so as to be formed simultaneously, and therefore, the support 18 (more specifically, the opposing surface 54) is easily machined.

Embodiment 4

Figure 9:
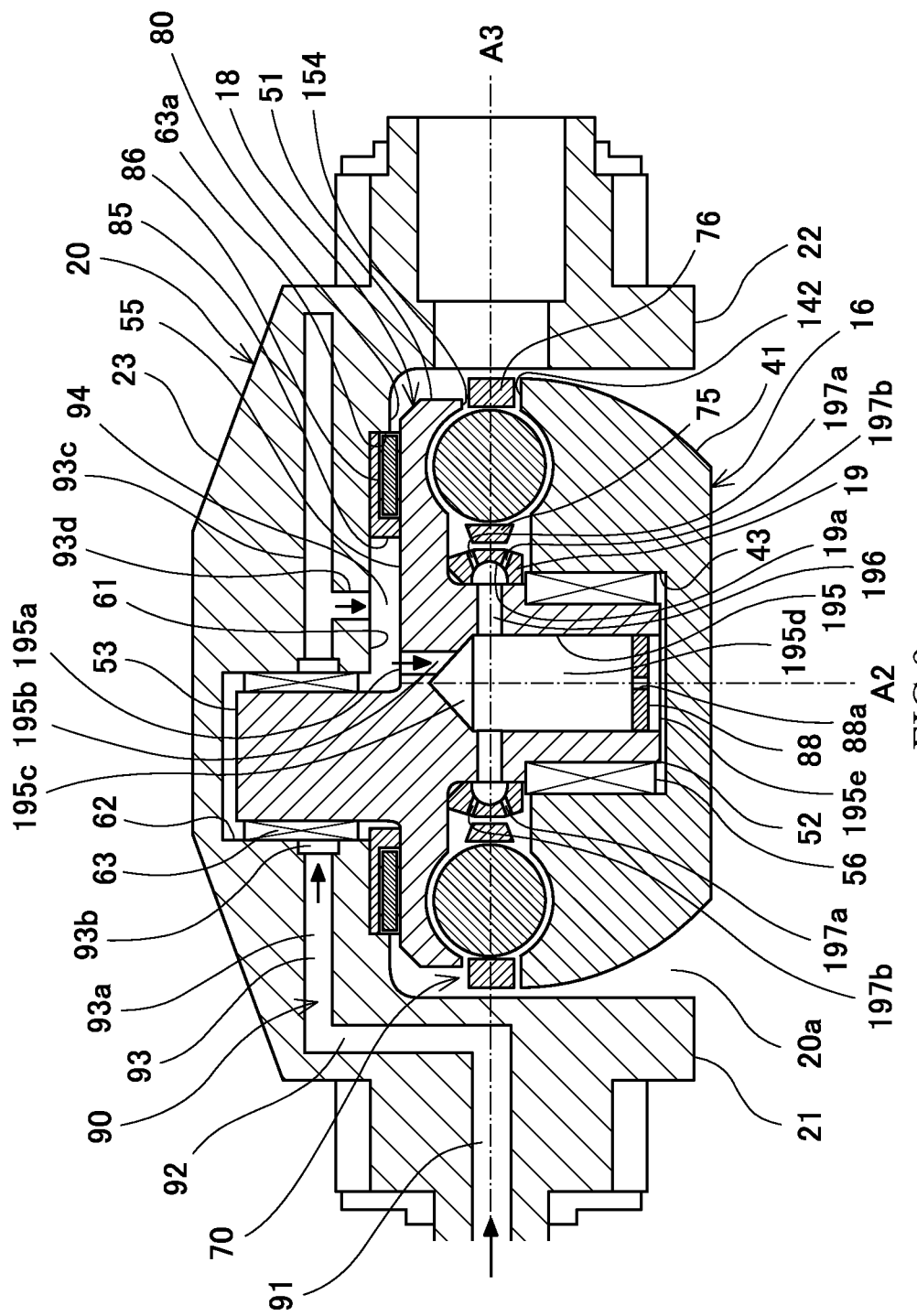
FIG. 9 is a sectional view showing the power roller and the trunnion in Embodiment 4.

Next, the transmission according to Embodiment 4 will be described with reference to FIG. 9. The transmission according to Embodiment 4 adopts the opposing surfaces 142 and 152 of Embodiment 2. Moreover, the transmission according to Embodiment 4 includes an oil passage 190 that is different from the oil passage 90 of Embodiment 1. The following will mainly describe the oil passage 190. The same reference signs are used for the common components to the above embodiments, and the repetition of the same explanation is avoided.

The oil passage 190 includes the inflow oil passage 91, the pivot oil passage 92, the main body oil passage 93, the oil chamber 94, a penetrating oil passage 195, branch oil passages 196, and nozzles 197. Among these, the inflow oil passage 91, the pivot oil passage 92, the main body oil passage 93, and the oil chamber 94 are the same as those of Embodiment 1, and therefore, the explanations thereof are omitted.

The penetrating oil passage 195 penetrates the inside of the support 18 in the direction along the rotation axis A2. Specifically, the penetrating oil passage 195 extends in the direction along the rotation axis A2 from an inflow opening 195a of the outer surface 55 of the support 18 to an outflow opening 195e of the end surface of the spindle 52. The penetrating oil passage 195 includes a small-diameter passage portion 195b, an enlarged-diameter passage portion 195c, and a middle-diameter passage portion 195d in this order in a direction from the inflow opening 195a toward the outflow opening 195e. Since the inflow opening 195a, the small-diameter passage portion 195b, and the enlarged-diameter passage portion 195c are the same as those of Embodiment 1, the explanations thereof are omitted.

The middle-diameter passage portion 195d is substantially columnar. A center line of the middle-diameter passage portion 195d and the rotation axis A2 are located on the same straight line. A second end portion of the enlarged-diameter passage portion 195c is connected to a first end portion of the middle-diameter passage portion 195d. The outflow opening 195e is located at a second end portion of the middle-diameter passage portion 195d. A diameter of the middle-diameter passage portion 195d is equal to a diameter of an end portion, close to the outflow opening 195e, of the enlarged-diameter passage portion 195c.

The branch oil passages 196 extend from the penetrating oil passage 195 (more specifically, the middle-diameter passage portion 195d) in respective directions orthogonal to the rotation axis A2. The branch oil passages 196 are located between the opposing surface 42 of the power roller 16 and the opposing surface 254 of the support 18 in the direction along the rotation axis A2. Specifically, the branch oil passages 196 are formed at a root portion of the spindle 52. The branch oil passages 196 are arranged so as to be lined up in the circumferential direction about the rotation axis A2 at equal intervals.

An annular member 19 is disposed around the root portion of the spindle 52 of the support 18. The annular member 19 is located between the opposing surface 42 of the power roller 16 and the opposing surface 54 of the support 18 in the direction along the rotation axis A2 and at a radially inner side of the first thrust bearing 70 (more specifically, the first retainer 72). A center axis of the annular member 19 coincides with the rotation axis A2. A groove 19a is formed on an inner peripheral surface of the annular member 19 so as to extend in a circumferential direction over the entire periphery. In the present embodiment, the shape of a section of the groove 19a taken along the rotation axis A2 is a circular-arc shape but is not especially limited. The branch oil passages 196 are open so as to face the groove 19a.

The annular member 19 includes the nozzles 197. The nozzles 197 are open so as to face a space in the groove 19a. To be specific, the space in the groove 19a communicates with the branch oil passages 196 and the nozzles 197, and the oil flowing from the penetrating oil passage 195 into the branch oil passages 196 passes through the space in the groove 19a and flows into the nozzles 197. The nozzles 197 include first nozzles 197a and second nozzles 197b arranged at positions closer to the power roller 16 than the first nozzles 197a.

The first nozzles 197a and the second nozzles 197b are the same as the first nozzles 96a and the second nozzles 96b described in Embodiment 1 except that: the first nozzles 197a and the second nozzles 197b are formed at the annular member 19; and the oil flows from the groove 19a of the annular member 19 into the first nozzles 197a and the second nozzles 197b. To be specific, the virtual axis L1 of the discharge port of the first nozzle 197a reaches the first bearing groove 101 without contacting the first inner groove shoulder portion 202 and the inner peripheral portion 75 of the first retainer 72, and the virtual axis L2 of the discharge port of the second nozzle 197b reaches the second bearing groove 111 without contacting the second inner groove shoulder portion 212 and the inner peripheral portion 75 of the first retainer 72.

The present embodiment can obtain the same effects as Embodiment 1.

Other Embodiments

The above embodiments are examples and may be suitably modified within the scope of the present disclosure.

For example, the supply of the oil to the trunnion may be performed from the second pivot. Moreover, the transmission may be of a middle output type instead of the middle input type. According to the middle output type, a transmission input shaft is inserted into a hollow transmission output shaft and projects from the transmission output shaft toward both sides, i.e., an arrangement relation between an input element and an output element is opposite to that of the middle input type. The transmission may be of a single cavity type including a pair of discs that are an input disc and an output disc, instead of the double cavity type.

Moreover, the arrangement of the trunnion (tilt axis) relative to the input disc and the output disc may be changed as long as power transmission is effectively performed. For example, the tilt axis may be suitably changed as long as the tilt axis contacts a virtual circle having a predetermined size about the transmission center axis on a plane perpendicular to the transmission center axis.

The transmission may be of a full toroidal type instead of the half toroidal type. In this case, the power roller may have a disc shape. The device input shaft and the transmission center axis may be orthogonal to each other or may be skew lines. The gear pair may be intersecting axes gears or non-intersecting axes gears.

Moreover, the shape of the first retainer of the first thrust bearing is not limited to the shape described in the above embodiments. For example, in the above embodiments, the inner peripheral portion 75 of the first retainer 72 includes: the inclined surface 75a facing the support 18; and the inclined surface 75b facing the power roller 16. However, one or both of a surface of the inner peripheral portion 75 which faces the support 18 and a surface of the inner peripheral portion 75 which faces the power roller 16 may be orthogonal to the center line C of the first retainer 72. Moreover, in the illustrated example, the surface of the inner peripheral portion 75 which faces the support 18 and the surface of the inner peripheral portion 75 which faces the power roller 16 are constituted only by inclined surfaces. However, the surface of the inner peripheral portion 75 which faces the support 18 and the surface of the inner peripheral portion 75 which faces the power roller 16 may be constituted by inclined surfaces and surfaces orthogonal to the center line C of the first retainer 72.

Moreover, the first retainer does not have to include the swelling portions that swell in the direction along the center line of the first retainer. For example, if the first retainer 72 does not include the first swelling portions 74a and the second swelling portions 74b in Embodiments 1 and 2, a range where the first retainer 72 moves between the opposing surface 42 of the power roller 16 and the opposing surface 54 of the support 18 in the direction along the rotation axis A2 is limited by the first outer groove shoulder portion 103 and the second outer groove shoulder portion 113. To be specific, the first retainer 72 is guided by the first outer groove shoulder portion 103 and the second outer groove shoulder portion 113.

Moreover, the shape of the penetrating oil passage is not limited to the shapes described in the above embodiments and may be suitably changed. Moreover, when a flow path sectional area of the penetrating oil passage from the inflow opening to the outflow opening is adequately small, and therefore, the hydraulic pressure in the penetrating oil passage can be made high, the closing member, such as an insertion plug, does not have to be disposed in the penetrating oil passage. However, since the weight of the support can be reduced by increasing the size of the flow path of the penetrating oil passage, it is preferable that as in the above embodiment, the penetrating oil passage having a large flow path sectional area be formed, and the closing member be disposed in the penetrating oil passage.

In the above embodiments, the baffle plate 85 does not have to be disposed at a radially outer side of the oil chamber 94 and a radially inner side of the second retainer. For example, the baffle plate 85 may be arranged between the support 18 and the trunnion 20 and at a radially outer side of both the oil chamber 94 and the second retainer 82. Moreover, in the above embodiments, the baffle plate 85 does not have to project at the inner edge of the shim 86 and may project at another portion of the shim 86, such as the outer edge of the shim 86. Moreover, the baffle plate does not have to project at the shim. For example, the baffle plate may project at the opposing surface of the trunnion or one of surfaces of the support which are opposed to each other in the direction along the rotation axis. To be specific, the baffle plate 85 of Embodiment 1 may project at the inner surface 61 of the main body 23 of the trunnion 20 or the outer surface 55 of the support 18. In this case, the shim 86 between the trunnion 20 and the support 18 may be omitted. Moreover, the baffle plate may not be fixed to the trunnion 20 and the support 18.

Moreover, the components in Embodiments 1 to 4 may be suitably combined with each other. For example, the shape of the opposing surface 142 of the power roller 16 in Embodiment 2 may be adopted as the shape of the opposing surface 42 of the power roller 16 of Embodiment 1. Moreover, the configuration of the oil passage 190 of Embodiment 4 may be adopted in Embodiment 1 or 3.

Targets to which the toroidal continuously variable transmission described in the above embodiments is applied are not limited to electric power generating apparatuses for aircrafts and may be other electric power generating apparatuses, automobiles, and various industrial machines.

REFERENCE SIGNS LIST 10 toroidal continuously variable transmission
13 input disc 14 output disc
16 power roller
18 support
20 trunnion
51 flange
52 spindle
53 attaching shaft
70 first thrust bearing
71 first rolling element
72 first retainer
73 first retaining hole
74a first swelling portion
74b second swelling portion
75 inner peripheral portion
75a inclined surface
75b inclined surface
80 second thrust bearing
80 bearing
81 second rolling element
82 second retainer
83 second retaining hole
85 baffle plate
86 shim
88 insertion plug
88a through hole
90 oil passage
94 oil chamber
95 penetrating oil passage
95a inflow opening
95f outflow opening
96 nozzle
96a first nozzle
96b second nozzle
101 first bearing groove
102 first inner groove shoulder portion
102a parallel surface
102b inclined surface
103 first outer groove shoulder portion
111 second bearing groove
112 second inner groove shoulder portion
112a parallel surface
112b inclined surface
113 second outer groove shoulder portion
190 oil passage
195 penetrating oil passage
195a inflow opening
195e outflow opening
197 nozzle
197a first nozzle
197b second nozzle
202 first inner groove shoulder portion
203 first outer groove shoulder portion
212 second inner groove shoulder portion
A2 rotation axis
L1 virtual axis
L2 virtual axis

The invention claimed is:

1. A toroidal continuously variable transmission comprising:
   an input disc and an output disc arranged so as to be opposed to each other;
   a power roller that is sandwiched between the input disc and the output disc so as to be tiltable and transmits rotational driving force of the input disc to the output disc at a change gear ratio corresponding to a tilt angle of the power roller;
   a trunnion that is tiltable about a tilt axis of the power roller;
   a support that is arranged between the trunnion and the power roller in a direction along a rotation axis of the power roller and supports the power roller such that the power roller is rotatable relative to the trunnion about the rotation axis;
   a thrust bearing that receives a load of the rotating power roller in the direction along the rotation axis; and
   an oil passage through which lubricating oil is supplied to the thrust bearing, wherein:
   an opposing surface of the support which surface is opposed to the power roller includes a first bearing groove having an annular shape about the rotation axis;
   an opposing surface of the power roller which surface is opposed to the support includes a second bearing groove that is opposed to the first bearing groove and has an annular shape about the rotation axis;
   the thrust bearing includes
     rolling elements held by the first bearing groove and the second bearing groove so as to be rollable and
     an annular retainer arranged between the power roller and the support and including retaining holes that hold the rolling elements;
   the oil passage includes nozzles that are located at a radially inner side of the retainer and define a flow direction of the lubricating oil flowing toward the thrust bearing, each of virtual axes of discharge ports of the nozzles extending in the flow direction of the nozzle and reaching the first bearing groove;
   the support including the first bearing groove includes an inner groove shoulder portion that is a portion located at a radially inner side of the first bearing groove;
   regarding each of the virtual axes, when viewed from a direction which is perpendicular to the virtual axis and the direction along the rotation axis, the inner groove shoulder portion and an inner peripheral portion of the retainer which is a portion located at a radially inner side of the retaining holes are located at respective sides opposite to each other across the virtual axis and away from the virtual axis; and
   one or each of the inner groove shoulder portion and the inner peripheral portion includes an inclined surface that is inclined along the flow direction of the nozzle relative to a plane perpendicular to the direction along the rotation axis.

2. The toroidal continuously variable transmission according to claim 1, wherein the virtual axis reaches a contact portion between the first bearing groove and the rolling element without contacting the inner groove shoulder portion and the inner peripheral portion.

3. The toroidal continuously variable transmission according to claim 1, wherein:
   the support including the first bearing groove includes an outer groove shoulder portion that is a portion located at a radially outer side of the first bearing groove; and
   the inner groove shoulder portion and the outer groove shoulder portion include respective surfaces that are perpendicular to the direction along the rotation axis and are located at the same position in the direction along the rotation axis.

4. The toroidal continuously variable transmission according to claim 1, wherein:
   the retainer includes a first swelling portion and a second swelling portion, the first swelling portion swelling toward one side in a direction along a center line of the retainer, the second swelling portion swelling toward the other side in the direction along the center line of the retainer, the first swelling portion and the second swelling portion being located between the two retaining holes adjacent to each other;

when the retainer moves toward the support, the first swelling portion contacts the first bearing groove; and when the retainer moves toward the power roller, the second swelling portion contacts the second bearing groove.

5. The toroidal continuously variable transmission according to claim 1, wherein:

the oil passage includes a penetrating oil passage that penetrates an inside of the support in the direction along the rotation axis; and the nozzles are oil passages extending from the penetrating oil passage.

6. The toroidal continuously variable transmission according to claim 5, wherein:

the thrust bearing is a first thrust bearing;

a second thrust bearing is disposed between the support and the trunnion in the direction along the rotation axis;

the second thrust bearing includes
second rolling elements lined up in a rotational direction of the power roller and
an annular second retainer including second retaining holes that hold the second rolling elements;

an oil chamber is located between the support and the trunnion and at a radially inner side of the second retainer;

the oil passage includes a trunnion oil passage that is located inside the trunnion and includes an outflow opening that is open toward the oil chamber;

an inflow opening of the penetrating oil passage is open toward the oil chamber; and a baffle plate is disposed between the support and the trunnion, at a radially outer side of the oil chamber, and around the rotation axis.

7. The toroidal continuously variable transmission according to claim 6, wherein:

an annular shim against which the second rolling elements are pressed is disposed on an end surface of the trunnion, the end surface being opposed to the support in the direction along the rotation axis; and the baffle plate projects at the shim.

8. The toroidal continuously variable transmission according to claim 6, wherein the baffle plate projects at one of a surface of the trunnion and a surface of the support, the surfaces being opposed to each other in the direction along the rotation axis.

9. The toroidal continuously variable transmission according to claim 1, wherein a closing member that partially closes a flow path of the penetrating oil passage is disposed at the support.

10. The toroidal continuously variable transmission according to claim 9, wherein the closing member is an insertion plug that is inserted into the penetrating oil passage through an outflow opening of the penetrating oil passage.

11. A toroidal continuously variable transmission comprising:

an input disc and an output disc arranged so as to be opposed to each other;

a power roller that is sandwiched between the input disc and the output disc so as to be tiltable and transmits rotational driving force of the input disc to the output disc at a change gear ratio corresponding to a tilt angle of the power roller;

a trunnion that is tiltable about a tilt axis of the power roller;

a support that is arranged between the trunnion and the power roller in a direction along a rotation axis of the power roller and supports the power roller such that the power roller is rotatable relative to the trunnion about the rotation axis;

a thrust bearing that receives a load of the rotating power roller in the direction along the rotation axis; and an oil passage through which lubricating oil is supplied to the thrust bearing, wherein:

an opposing surface of the support which surface is opposed to the power roller includes a first bearing groove having an annular shape about the rotation axis;

an opposing surface of the power roller which surface is opposed to the support includes a second bearing groove that is opposed to the first bearing groove and has an annular shape about the rotation axis;

the thrust bearing includes
rolling elements held by the first bearing groove and the second bearing groove so as to be rollable and
an annular retainer arranged between the power roller and the support and including retaining holes that hold the rolling elements;

the oil passage includes nozzles that are located at a radially inner side of the retainer and define a flow direction of the lubricating oil flowing toward the thrust bearing, each of virtual axes of discharge ports of the nozzles extending in the flow direction of the nozzle and reaching the second bearing groove;

the power roller including the second bearing groove includes an inner groove shoulder portion that is a portion located at a radially inner side of the second bearing groove;

regarding each of the virtual axes, when viewed from a direction which is perpendicular to the virtual axis and the direction along the rotation axis, the inner groove shoulder portion and an inner peripheral portion of the retainer which is a portion located at a radially inner side of the retaining holes are located at respective sides opposite to each other across the virtual axis and away from the virtual axis; and one or each of the inner groove shoulder portion and the inner peripheral portion includes an inclined surface that is inclined along the flow direction of the nozzle relative to a plane perpendicular to the direction along the rotation axis.

* * * * *